2 Sheets—Sheet 1.

H. B. SMITH & J. SALTAR, Jr.
MACHINE FOR MAKING WOODEN RODS AND DOWEL-PINS.

No. 189,510. Patented April 10, 1877.

Witnesses:
Lewis F. Brous
A. P. Grant

Inventors:
H. B. Smith
John Saltar, Jr.
by John A. Wiedersheim
Attorney.

N. PETERS, PHOTO-LITHOGRAPHER, WASHINGTON, D. C.

2 Sheets—Sheet 2.

H. B. SMITH & J. SALTAR, Jr.
MACHINE FOR MAKING WOODEN RODS AND DOWEL-PINS.

No. 189,510. Patented April 10, 1877.

Witnesses:
Lewis F. Brous,
A. P. Grant.

Inventors:
H. B. Smith,
John Saltar, Jr.
by John A. Wiedersheim
Attorney.

N. PETERS, PHOTO-LITHOGRAPHER, WASHINGTON, D. C.

UNITED STATES PATENT OFFICE.

HEZEKIAH B. SMITH AND JOHN SALTAR, JR., OF SMITHVILLE, N. J.

IMPROVEMENT IN MACHINES FOR MAKING WOODEN RODS AND DOWEL-PINS.

Specification forming part of Letters Patent No. 189,510, dated April 10, 1877; application filed November 20, 1876.

*To all whom it may concern:*

Be it known that we, HEZEKIAH B. SMITH and JOHN SALTAR, Jr., both of Smithville, in the county of Burlington and State of New Jersey, have invented a new and useful Improvement in Machines for Making Wooden Rods and Dowel-Pins; and we do hereby declare the following to be a clear and exact description of the nature thereof, sufficient to enable others skilled in the art to which our invention appertains to fully understand, make, and use the same, reference being had to the accompanying drawings, making part of this specification, in which—

Figure 1:
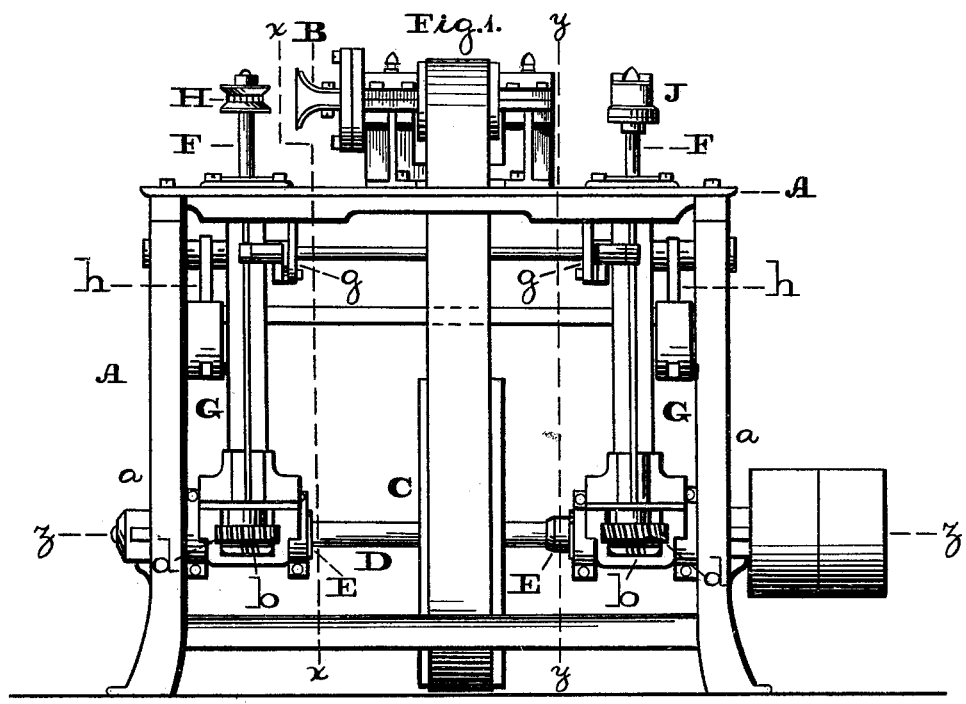
Figure 2:
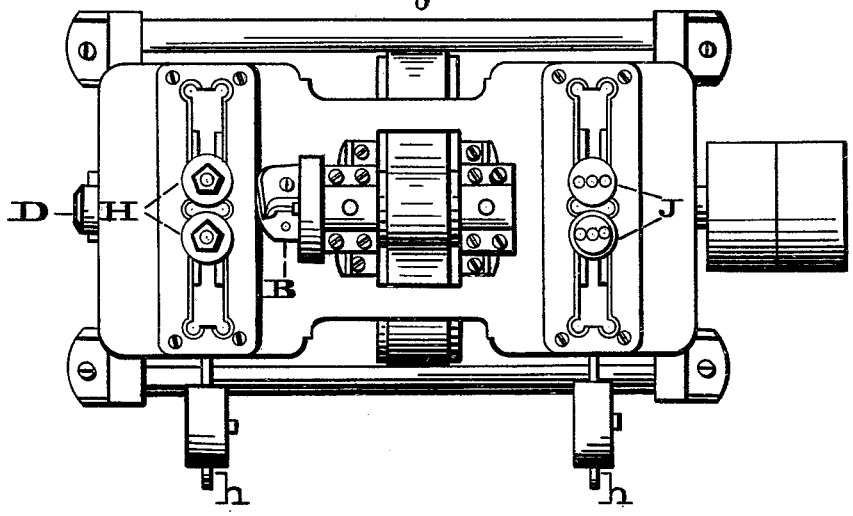
Figure 3:
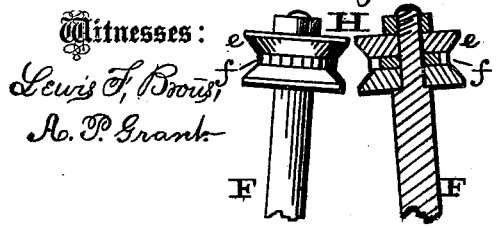
Figure 4:
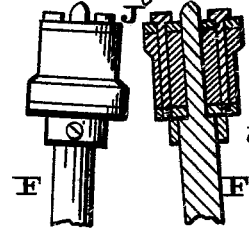
Figure 5:
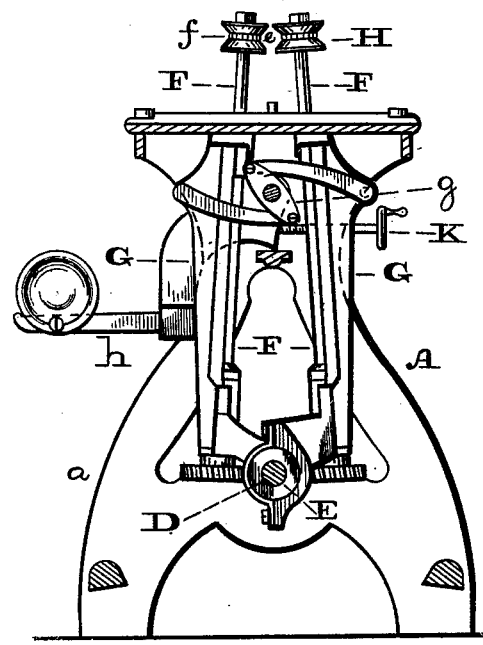
Figure 6:
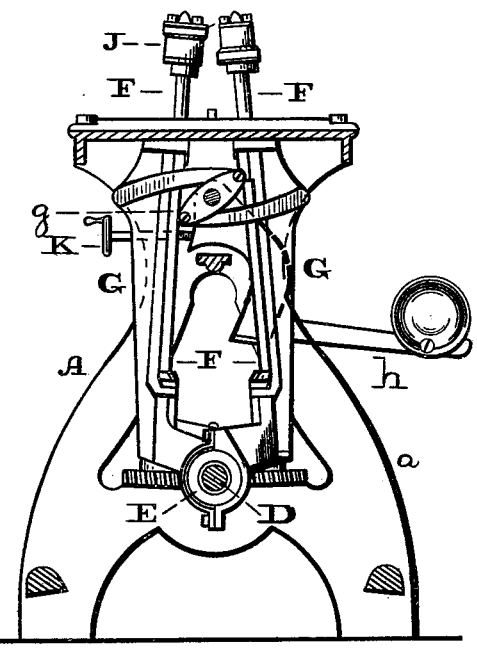
Figure 7:
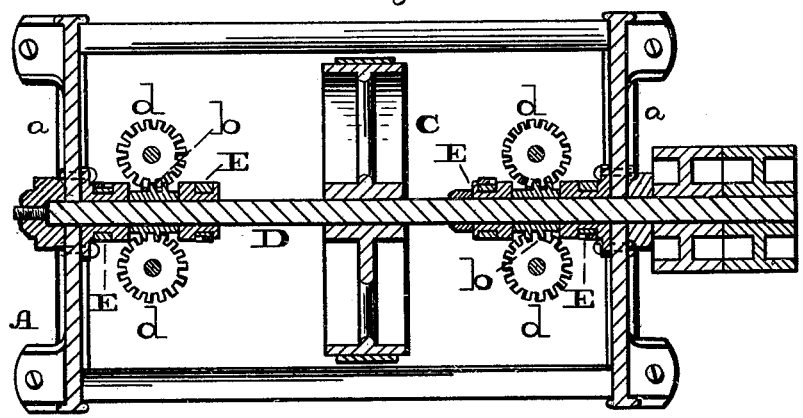
Figure 8:
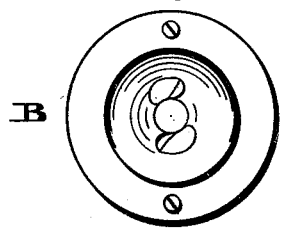

Figure 1 is a side elevation of the apparatus embodying our invention. Fig. 2 is a top or plan view thereof. Figs. 3 and 4 are side and sectional views of the feed-rollers. Fig. 5 is a vertical section in line $x$ $x$, Fig. 1. Fig. 6 is a similar view in line $y$ $y$. Fig. 7 is a horizontal section in line $z$ $z$, Fig. 1. Fig. 8 is a face view of the cutter.

Similar letters of reference indicate corresponding parts in the several figures.

Our invention relates to an apparatus for forming wooden rods, dowel-pins, and other articles of cylindrical shape; and it consists of feed-rollers mounted on shafts, whose bearing-arms open and close in reverse order, and have a common axis.

It also consists of a sleeve encircling, or partially encircling, a worm upon the main shaft, and having openings in its sides for the projection of the worm-wheels, which mesh with the worm, said wheels being secured to the shafts of the feed-rollers, and the sleeve supported independently of the main shaft, whereby the main shaft will be relieved of the weight and strain of the feed-rollers, roller-shafts, and bearing-arms, and the latter revolve about the sleeve in opening and closing, in such a manner that the worm-gearing is always in perfect action.

It also consists of V-grooved feed-rollers, so constructed that their sides simply guide the stick and keep it from turning without marking it, to the detriment of the finished rod, and the serrated or corrugated angle of the groove cuts the stick deeply on the corners thereof, where most of the timber is to be removed, thus aiding the cutters, and producing a strong positive feed.

It also consists of discharge feed-rollers, formed with shoulders at opposite ends, and made adjustable on their shafts, so that they are adapted to fit finished rods of any size.

It also consists of stops for limiting the closing movements of the feed-rollers.

Referring to the drawings, A represents the table or frame for supporting the various parts of the apparatus. B represents a hollow rotary cutter, which is mounted on the table A, and receives power by means of a band from the driving-wheel C on the main shaft D, which is properly mounted on the upright portions $a$ of the table or frame below the cutter B.

To the inner sides of the uprights $a$ there are secured horizontally-extending sleeves E, which encircle the shaft D, but are supported independently thereof. A worm, $b$, is secured to, or formed with, the shaft on each side thereof, and located within the space circumscribed by the sleeve, and the sides of the sleeves are cut away for the insertion of worm-wheels $d$, which are secured to the lower end of vertically-extending rotating shafts F, and mesh with the worms $b$.

These shafts F are mounted on arms G, which have axial motions, and their bearings are on the sleeves E, the arms being adapted to separate or open, and approach or close, in reverse order. To the upper ends of one pair of shafts E there are secured feed-rollers H, and to the upper ends of the other pair of shafts there are secured feed-rollers J, the rollers projecting above the table, and arranged with their central portions coincident with the opening of the hollow cutter B.

Each roller H has a face beveling to the center, forming a V-shaped groove, $e$, and at the center of the bevel or groove there is a serrated surface, $f$. Each roller J consists of a shouldered cylinder or cone, with the shoulders in reverse order, or arranged at the upper end of one roller and the lower end of the other roller, respectively.

In order to open and close the arms G, and consequently the feed-rollers, there are connected to the arm suitable levers, toggles, or otherwise, as at $g$, which, by means of a lever,

*h*, for each pair of arms, properly operated, will cause the arms to recede and approach.

K represents screws, which are fitted to the table or frame A, and located in relation to the levers *g*, that they act as stops therefor, and limit the closing motions of the feed-rollers.

The operation is as follows:

Power is communicated to the main shaft, whereby the driving-wheel imparts motion to the rotary cutter B. The main shaft, owing to the worms *b*, which gear with the worm-wheels *d*, imparts rotary motion to the shafts F, and consequently to the feed-rollers.

The stick or piece of wood, which may be of angular or irregular form in cross-section, is introduced between the feed-rollers H, previously separated, which, owing to the serrated surfaces *f*, grasp the stick, and the bevel faces or grooves *e* embrace the stick, so as to prevent its rotation.

The feed-rollers H are opened or separated by operating the respective lever *h*, whereby the levers *g* move the arms G in opposite directions, the shafts F, which carry the rollers, being mounted on said arms G. After the stick has been applied to the rollers, the lever *h* is operated, whereby the rollers approach and close on the stick, where they are held by the weight of the lever, or otherwise. The stick is now fed forward by the rollers H, so that it reaches the cutter B, which, owing to its construction, rounds the same, as is evident. The stick now passes through the hollow axial shaft of the cutter, and reaches, and is engaged by, the rollers J, whose rotation assists in carrying forward the stick at its rounded portion and discharging it.

The shoulders of the rollers J, being in reverse order, as has been stated, serve to guide the stick, and prevent rising or falling thereof, so that it is held true. The rollers J are operated or opened and closed in a manner similar to the rollers H.

The bearing-arms G of each pair of shafts F occupy the same relation to their axis whether the rollers are opened or closed, since said arms G have a common axis, and said shafts a common operation; consequently the rollers may be made to feed sticks of various thicknesses without in any respect varying the manner of operation, or gage of the apparatus, or altering the parts thereof, excepting in the event of producing thicker rounds a larger cutter-head will be employed. Moreover, each pair of shafts is operated simultaneously from the main shaft, and the weight of the feed-rollers, their shafts, and the bearing-arms, while intimately connected with the main shaft, is removed from said shaft, and transmitted to the frame A, this being due to the sleeve E.

It will further be seen that as the sides or surfaces of the V-grooves of the rollers H are not corrugated or roughened, but are left smooth, said sides guide the stick, and keep it from turning, and they do not mark the stick to the detriment of the finished rod. The serrated or corrugated surface at the center of the groove or angle of the V, cuts the stick deeply on its corners, where most of the timber is to be removed, thus aiding the cutters, and producing a strong positive feed.

The discharge-rollers J, with shoulders at opposite ends, are fitted to the respective shafts E, so as to be adjusted vertically thereon, and as said rollers are adjustable laterally, it is evident that the rollers will fit any size of finished rods within the capacity of the apparatus.

We are aware that the feeding devices of some wood-working machines have been arranged so as not to bear directly upon the main shaft of the machine, and have been operated to approach and recede from one another, or to open and close reversely.

Having thus described our invention, what we claim as new, and desire to secure by Letters Patent, is—

1. The combination of the rotary shafts F, carrying the feed-rollers H and J, the shaft-bearing arms G, the levers *g* and *h*, and gearing *b d*, substantially as shown and described.

2. The combination of the sleeves E, main shaft D, gearing *b d*, feed-roller shafts F, and shaft-bearing arms G, constructed and arranged substantially as shown, for the purpose specified.

3. The feed-rollers J, constructed as shown in Fig. 4, having shoulders at opposite ends, and adjustable relatively to one another, substantially as and for the purpose specified.

4. The feed-rollers H, formed of V-grooves, with smooth sides and serrations or corrugations at the center or angle, substantially as and for the purpose set forth.

5. The bearing-arms G of the roller-shafts F, and the connected levers *g*, in combination with the adjusting or regulating screw-stop K, substantially as and for the purpose set forth.

H. B. SMITH.
JOHN SALTAR, JR.

Witnesses:
JOHN A. WIEDERSHEIM,
A. P. GRANT.